(12) United States Patent
Kannawadi et al.

(10) Patent No.: US 11,336,549 B2
(45) Date of Patent: May 17, 2022

(54) SYSTEMS AND METHODS FOR DYNAMICALLY OPTIMIZING TCP FLOW IN WAN NETWORKS

(71) Applicant: Cisco Technology, Inc., San Jose, CA (US)

(72) Inventors: Pradeepan Kannawadi, Dublin, CA (US); Venkatesh Nataraj, Union City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/743,143

(22) Filed: Jan. 15, 2020

(65) Prior Publication Data

US 2021/0218653 A1    Jul. 15, 2021

(51) Int. Cl.
| | | |
|---|---|---|
| *H04L 12/26* | (2006.01) | |
| *H04L 43/0817* | (2022.01) | |
| *H04L 43/0829* | (2022.01) | |
| *H04L 41/08* | (2022.01) | |
| *H04L 43/10* | (2022.01) | |
| *H04L 41/12* | (2022.01) | |
| *H04L 43/0852* | (2022.01) | |
| *H04L 12/24* | (2006.01) | |

(52) U.S. Cl.
CPC ...... *H04L 43/0817* (2013.01); *H04L 41/0886* (2013.01); *H04L 41/12* (2013.01); *H04L 43/0829* (2013.01); *H04L 43/0852* (2013.01); *H04L 43/10* (2013.01)

(58) Field of Classification Search
CPC .. H04L 43/0817; H04L 41/0886; H04L 41/12

USPC .......................................................... 709/235
See application file for complete search history.

(56) References Cited

U.S. PATENT DOCUMENTS

| | | | | |
|---|---|---|---|---|
| 5,999,534 A | * | 12/1999 | Kim ................... | H04L 12/5602 370/395.42 |
| 2006/0190612 A1 | * | 8/2006 | Kahol .................... | H04L 69/16 709/230 |
| 2009/0109963 A1 | * | 4/2009 | Tanizawa ............... | H04L 12/66 370/352 |
| 2011/0225574 A1 | * | 9/2011 | Khalidi .................. | G06F 8/656 717/168 |
| 2011/0258333 A1 | * | 10/2011 | Pomerantz ............. | H04L 63/08 709/229 |
| 2013/0114394 A1 | * | 5/2013 | Hu ........................ | H04L 43/103 370/216 |
| 2014/0052994 A1 | * | 2/2014 | Sabin .................... | H04L 9/3247 713/176 |
| 2014/0281018 A1 | * | 9/2014 | Waclawsky ........... | H04L 69/163 709/235 |
| 2014/0355623 A1 | * | 12/2014 | Waclawsky ........... | H04L 69/163 370/465 |

(Continued)

*Primary Examiner* — Mahran Y Abu Roumi
(74) *Attorney, Agent, or Firm* — Baker Botts, LLP (57) ABSTRACT

In one embodiment, a method includes receiving, by a network controller, network characteristics from a network component. The network characteristics are associated with one or more nodes of a network. The method also includes analyzing, by the network controller, the network characteristics to generate configuration parameters for the one or more nodes of the network. The method further includes communicating, by the network controller, the configuration parameters to the one or more nodes of the network.

11 Claims, 3 Drawing Sheets

(56) References Cited

U.S. PATENT DOCUMENTS

| | | | |
|---|---|---|---|
| 2016/0255009 A1* | 9/2016 | Ramaiah | H04L 47/27 |
| | | | 370/235 |
| 2017/0005990 A1* | 1/2017 | Birger | G06F 21/74 |
| 2018/0255175 A1* | 9/2018 | Tran | H04L 65/80 |
| 2019/0007518 A1* | 1/2019 | McElhoe | H04L 43/04 |
| 2019/0158371 A1* | 5/2019 | Dillon | H04L 43/087 |
| 2019/0199626 A1* | 6/2019 | Thubert | H04L 47/19 |

* cited by examiner

SYSTEMS AND METHODS FOR DYNAMICALLY OPTIMIZING TCP FLOW IN WAN NETWORKS

TECHNICAL FIELD

This disclosure generally relates to optimizing Transmission Control Protocol (TCP) flow, and more specifically to systems and methods for dynamically optimizing TCP flow in wide area networks (WANs).

BACKGROUND

Due to TCP's sensitivity to delay and packet loss, TCP performance is traditionally used as a metric for optimizing the performance of a network for particular application usage. Currently available TCP flow optimization methods are provisioned statically by a user (e.g., an administrator), which is a labor intensive task that often requires redundant work and wasted time due to trial and error. Additionally, application experience across the network is rigid and tied to the network conditions existing at the time of provisioning.

DESCRIPTION OF EXAMPLE EMBODIMENTS

Overview

According to an embodiment, a network controller includes one or more processors and one or more computer-readable non-transitory storage media coupled to the one or more processors. The one or more computer-readable non-transitory storage media include instructions that, when executed by the one or more processors, cause the network controller to perform operations including receiving, from a network component, network characteristics associated with one or more nodes of a network. The operations also include analyzing the network characteristics to generate configuration parameters for the one or more nodes of the network. The operations further include communicating the configuration parameters to the one or more nodes of the network. Receiving the network characteristics, analyzing the network characteristics, and communicating the configuration parameters may be performed in real-time.

In certain embodiments, analyzing the network characteristics to generate the configuration parameters for the one or more nodes of the network includes determining a first operating capacity of one or more systems of a first node of the network, determining a second operating capacity of one or more systems of a second node of the network, and generating one or more of the configuration parameters to balance the first and second operating capacities of the first and second nodes.

In some embodiments, analyzing the network characteristics to generate the configuration parameters for the one or more nodes of the network includes determining that traffic traversing a first connection from a first node to a second node of the network is associated with a first application, determining that traffic traversing a second connection from the first node to a third node of the network is associated with a second application, and generating one or more of the configuration parameters to prioritize the second application over the first application.

In certain embodiments, the network characteristics are associated with one or more of the following: latency, delay, packet loss, ping, network based application recognition (NBAR) results, and performance of one or more systems at the one or more nodes. The network characteristics may be generated by the network component using a bidirectional forwarding detection (BFD) protocol. The network component may be a router associated with a branch office of an enterprise or a network analytic module.

According to another embodiment, a method includes receiving, by a network controller, network characteristics from a network component. The network characteristics are associated with one or more nodes of a network. The method also includes analyzing, by the network controller, the network characteristics to generate configuration parameters for the one or more nodes of the network. The method further includes communicating, by the network controller, the configuration parameters to the one or more nodes of the network.

According to yet another embodiment, one or more computer-readable non-transitory storage media embody instructions that, when executed by a processor, cause the processor to perform operations including receiving, from a network component, network characteristics associated with one or more nodes of a network. The operations also include analyzing the network characteristics to generate configuration parameters for the one or more nodes of the network. The operations further include communicating the configuration parameters to the one or more nodes of the network.

Technical advantages of certain embodiments of this disclosure may include one or more of the following. Embodiments of this disclosure optimize TCP flow for individual applications to ensure quality of service in the TCP/IP stack. This disclosure describes systems and methods for dynamically optimizing TCP flow, which is less labor-intensive, less time consuming, and less prone to error than traditional TCP flow optimization systems and methods.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for dynamically optimizing TCP flow for individual applications to ensure quality of service in the TCP/IP stack. Prior to the development of software-defined networking in a WAN (SD-WAN), several optimization techniques for standard WAN were developed due to common problems encountered in WAN solutions including significant latency, delay, and packet loss across the different links of the WAN. Geographic diversity, discrepancies in computing, and general network unpredictability compounded the known problems. For example, a client may suddenly decide to download a large amount of data from a data center connected through a WAN along a seldom-used branch that may overload the capabilities, causing a ripple effect through the network.

Figure 1:
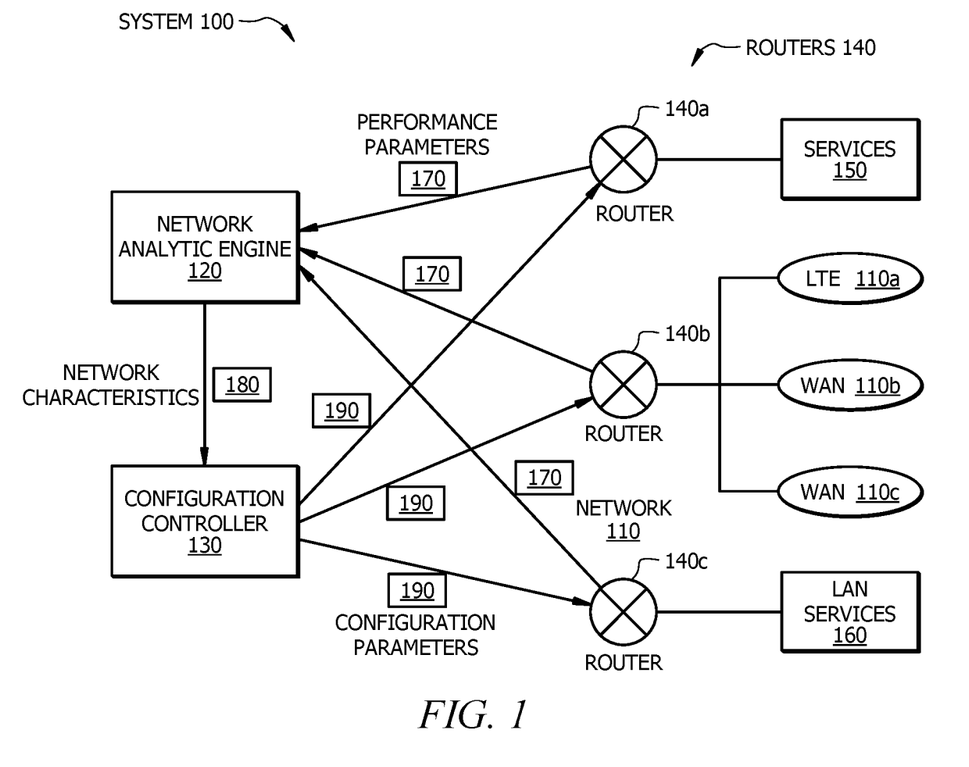
FIG. 1 illustrates an example system for dynamically optimizing TCP flow in WANs.
Figure 2:
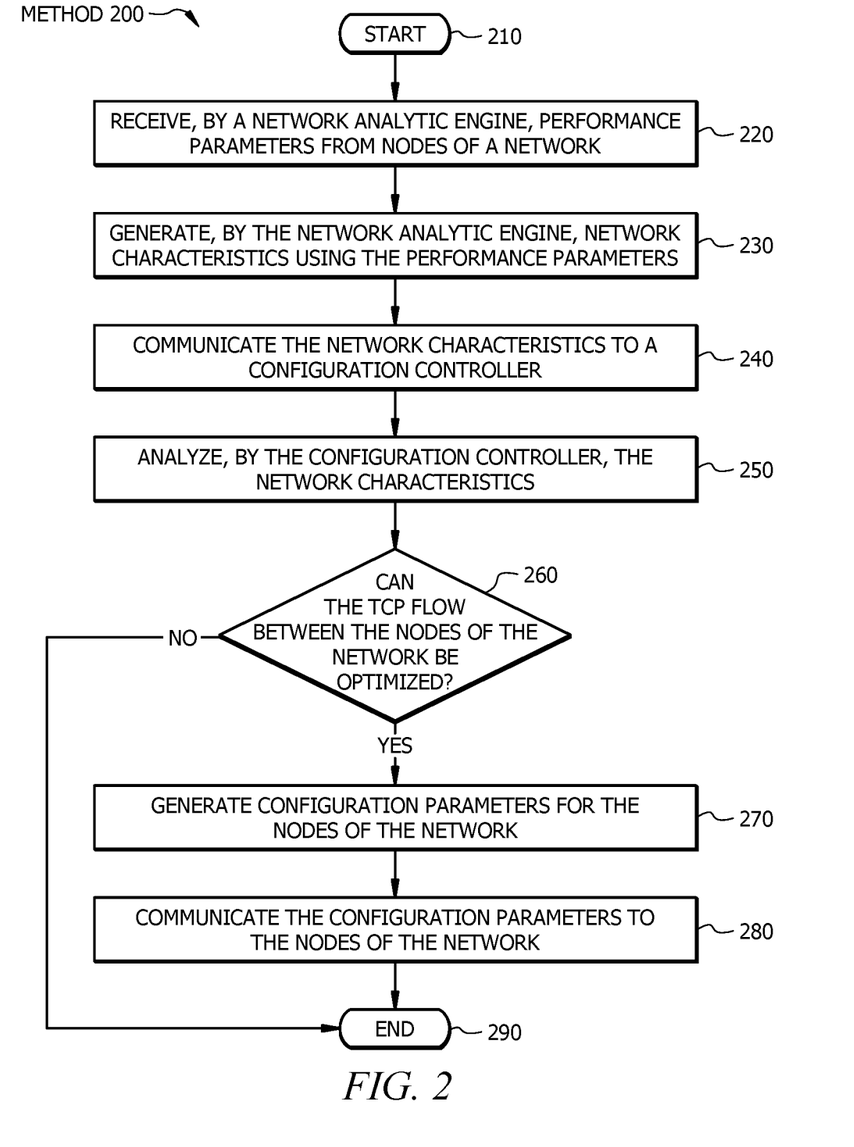
FIG. 2 illustrates an example method for dynamically optimizing TCP flow in WANs.
Figure 3:
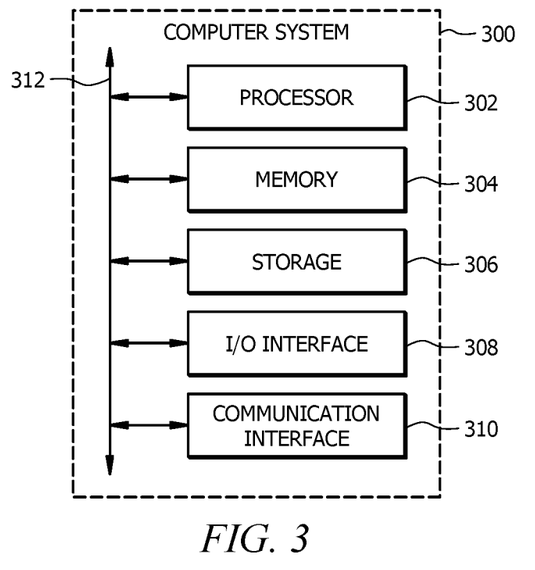
FIG. 3 illustrates an example computer system that may be used by the systems and methods described herein.

Typically, applications that are optimized are reliant on TCP. TCP is particularly sensitive to delay and packet loss and is thus used for optimization. However, TCP optimization processes require labor-intensive, static configurations for each link between nodes. For example, the TCP optimization process may require rigorous testing, which could easily miss difficult-to-predict scenarios. Many condition control algorithms (e.g., Bottleneck Bandwidth and Round-trip propagation time (BBR), CUBIC, etc.) have been developed to optimize the TCP flow between two nodes. The current TCP Flow optimization methods are provisioned/configured statically by the user, which results in a rigid application experience that is tied to the network conditions at the time of provisioning. This disclosure introduces systems and methods for using network analytics to dynamically adjust the TCP flow optimization/performance parameters. FIG. 1 shows an example system for dynamically optimizing TCP flow in WANs. FIG. 2 shows an example method for dynamically optimizing TCP flow in WANs. FIG. 3 shows an example computer system that may be used by the systems and methods described herein.

FIG. 1 illustrates an example system 100 for dynamically optimizing TCP flow in WANs. System 100 or portions thereof may be associated with an entity, which may include any entity, such as a business or company (e.g., a service provider) that dynamically optimizes TCP flow in WANs. The components of system 100 may include any suitable combination of hardware, firmware, and software. For example, the components of system 100 may use one or more elements of the computer system of FIG. 3. System 100 includes networks 110, a network analytic engine 120, a configuration controller 130, routers 140, services 150, and local area network (LAN) services 160.

Network 110 of system 100 facilitates communication between components of system 100. For example, network 110 of system 100 may connect one or more components (e.g., network analytic engine 120, configuration controller 130, routers 140, services 150, and LAN services 160) of system 100. Network 110 includes different types of networks 110. In the illustrated embodiment of FIG. 1, network 110 includes a cellular (e.g., a Long Term Evolution (LTE)) network 110a, WAN 110b, and WAN 110c.

While FIG. 1 illustrates certain types of networks 110, this disclosure contemplates any suitable network 110. One or more portions of network 110 may include an ad-hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), an LTE network, a cellular telephone network, a combination of two or more of these, or other suitable types of networks 110. One or more portions of network 110 may be a communications network, such as a private network, a public network, a connection through Internet, a mobile network, a WI-FI network, a cloud network, etc. Network 110 may include a core network (e.g., a 4G and/or 5G network), an access network, an edge network, an internet service provider (ISP) network, a network service provider (NSP) network, an aggregation network, and the like. Network 110 may implement SD-WAN technology. SD-WAN is a specific application of software defined networking technology applied to WAN connections (e.g., broadband Internet, 4G, 5G, LTE, Multiprotocol Label Switching (MPLS), etc.).

Network analytic engine 120 of system 100 is a network component that collects data from nodes of network 110 and analyzes the collected data. In certain embodiments, network analytic engine 120 receives performance parameters 170 from routers 140. Performance parameters 170 are factors used to measure the performance of network 110. For example, performance parameters 170 may be used to measure bandwidth, throughput, latency, delay, jitter, error rate, packet loss, ping, and the like. In certain embodiments, performance parameters 170 may include network-based application recognition (NBAR) results (e.g., identifications of web-based applications, client/server applications, critical applications, non-critical applications, etc.). Network analytic engine 120 may receive performance parameters 170 from routers 140 in accordance with one or more proprietary protocols (e.g., vendor-dependent protocols).

In some embodiments, performance parameters 170 include an indication of the performance of one or more systems operating at particular nodes (e.g., servers, routers, devices, etc.) of network 110. For example, performance parameters 170 may be related to a node's current processing load, processing load capacity, current memory, memory capacity, operating time, scheduled maintenance, etc. Network analytic engine 120 may receive performance parameters 170 from routers 140 of network 110 on a historical or real-time basis. In certain embodiments, network analytic engine 120 may receive performance parameters 170 at predetermined time intervals.

Network analytic engine 120 may generate one or more network characteristics 180 using performance parameters 170 received from routers 140 of network 110. Network characteristics 180 include information associated with one or more individual nodes of network 110, one or more connections between nodes of network 110, and/or the performance of network 110 as a whole. In certain embodiments, network characteristics 180 represent a subset of performance parameters 170 received by network analytic engine 120. For example, network analytic engine 120 may generate network characteristics 180 by automatically selecting certain performance parameters 170 received from routers 140 of network 110 based on information requested by configuration controller 130. Network characteristics 180 are used by configuration controller 130 to generate configuration parameters 190 for nodes of network 110.

In certain embodiments, network analytic engine 120 uses one or more network protocols to generate network characteristics 180. The network protocols are any protocols that can measure network characteristics 180 of one or more components of system 100. The network protocols may include BFD, Border Gateway Protocol (BGP), Intermediate System to Intermediate System (IS-IS), Open Shortest Path First (OSPF), Enhanced Interior Gateway Routing Protocol (EIGRP), and the like. For example, network analytic engine 120 may use BFD to generate network characteristics 180 related to link failures within network 110.

Network analytic engine 120 may determine network characteristics 180 on a historical or real-time basis using data received from routers 140 of network 110. Network analytic engine 120 may be located in any suitable location to collect and analyze data for system 100. For example, network analytic engine 120 may be embodied as an independent network component in network 110. As another example, network analytic engine 120 may be incorporated into one or more routers 140 of network 110. Network analytic engine 120 communicates network characteristics 180 to configuration controller 130.

Configuration controller 130 of system 100 represents any suitable computing component that may be used to configure nodes of network 110. Configuration controller 130 may be used to process information for system 100, coordinate one or more components of system 100, and/or facilitate communication between one or more components of system 100.

Configuration controller 130 may receive data from and/or transmit data to one or more components of system 100. Configuration controller 130 may be located in any suitable location to process information for system 100. For example, configuration controller 130 may be embodied as an independent component in network 110. As another example, configuration controller 130 may be incorporated into one or more routers 140 of network 110.

In certain embodiments, configuration controller 130 is granted permission to configure certain nodes of network 110. For example, a network operator may grant configuration controller 130 permission to configure certain nodes of network 110, such as nodes associated with (e.g., controlled by) an NSP. Configuration controller 130 receives network characteristics 180 from network analytic engine 120 and analyzes network characteristics 180 to generate configuration parameters 190 for nodes of network 110. Configuration parameters 190 are parameters that control the behavior of one or more nodes of network 110. For example, configuration parameters 190 may specify the parameters used to connect two nodes of network 110. Configuration parameters 190 optimize performance of TCP flow in network 110. Configuration controller 130 may receive information (e.g., performance parameters 170 and/or network characteristics 180) from one or more components of network 110 in accordance with one or more proprietary protocols (e.g., vendor-dependent protocols).

Configuration controller 130 may analyze network characteristics 180 using one or more condition algorithms and/or machine learning principles. For example, configuration controller 130 may use machine learning to determine behavioral patterns of network 110 during specific time periods. In certain embodiments, configuration controller 130 generates configuration parameters 190 to fine-tune the topology of network 110 based on a time of day, demand, etc. In some embodiments, configuration controller 130 receives network characteristics 180 from network analytic engine 120 and/or from one or more routers 140 of network 110 in real-time and generates configuration parameters 190 governing node behavior on a similar real-time basis.

In certain embodiments, configuration controller 130 generates configuration parameters 190 that optimize one or more connections between nodes of network 110. For example, configuration controller 130 may detect a change (e.g., a spike) in traffic from a first node to second node of network 110. The change in traffic from the first node to the second node may be initiated by a client that has begun streaming significant amounts of data from a data center associated with the second node. Configuration controller 130 may generate configuration parameters 190 by fine-tuning the existing parameters relating to the configuration between the first node and second node to optimize the connection between the two nodes given the change in network demand. Configuration controller 130 may generate configuration parameters 190 for the first and second nodes without affecting the configuration of other nodes in network 110.

In some embodiments, configuration controller 130 generates configuration parameters 190 by optimizing node performance on an application basis. One or more routers 140 (e.g., router 140*a*, router 140*b*, router 140*c*, etc.) of network 110 may communicate the applications associated with traffic to configuration controller 130. For example, one or more routers 140 of network 110 may report the applications associated with traffic to network analytic engine 120, which then communicates the identifications of the applications to configuration controller 130. The identifications of the applications may be determined using NBAR results. Configuration controller 130 may determine a priority level associated with a given application being transported from a first node to a second node. For example, configuration controller 130 may determine that traffic from a first node to a second node of router 140*a* consists of traffic associated with a social networking platform. Configuration controller 130 may also determine that traffic from the first node to a third node of node 140*a* consists of traffic associated with a business-critical application (e.g., payment processing). Configuration controller 130 may generate configuration parameters 190 that adjust the parameters of the connection between the first node and the second and third nodes of router 140*a* to prioritize the connection to the third node over the second node.

In certain embodiments, configuration controller 130 generates configuration parameters 190 by determining the operating capacities (e.g., current processing load capacities, current memory capacities, etc.) of one or more systems of individual nodes. For example, configuration controller 130 may determine, using network characteristics 180 received from network analytic engine 120, a first operating capacity of one or more systems of a first node associated with router 140*b* of system 100 and determine a second operating capacity of one or more systems of a second node associated with router 140*b* of system 100. The first operating capacity may indicate that the system(s) of the first node are operating at near peak capacity, whereas the second operating capacity may indicate that the system(s) of the second node are under-utilized. Configuration controller 130 may then generate one or more of the configuration parameters 190 to balance the first and second operating capacities of the first and second nodes.

In some embodiments, configuration controller 130 of system 100 generates a before and after analysis of the network conditions. The before and after analysis may include a comparison of the performance of one or more components of network 110 (e.g., branch router 140*b*) using the existing configuration parameters to the performance of the one or more components of network 110 using configuration parameters 190 generated by configuration controller 130. Configuration controller 130 may communicate the before and after analysis of the network conditions to a user (e.g., a network operator). In some embodiments, configuration controller 130 communicates a request for information to one or more network operators. The requested information may include a review of a network configuration, one or more heuristics, one or more input preferences, and the like. Configuration controller 130 may use the requested information to generate one or more configuration parameters 190.

Routers 140 of system 100 are network components that analyze data being sent across network 110, determine routes for the data to travel network 110 based on the analysis, and communicate the data in accordance with the determined routes. In the illustrated embodiment of FIG. 1, routers 140 include router 140*a*, router 140*b*, and router 140*c*. Routers 140 are used to connect multiple networks together (e.g., a LAN network and an SD-WAN network). Routers 140 may include virtual and physical routers 140. Routers 140 may be associated with one or more branch offices. Each router 140 of system 100 may determine an appropriate path through SD-WAN to route incoming traffic. In certain embodiments, one or more routers 140 may route traffic along one or more paths using NBAR results. The paths through the network 110 include endpoints at specific services (e.g., services 150 and LAN services 160), data centers, etc. Each router 140 may have multiple exit interfaces.

Router 140a of system 100 includes a path to services 150. Services 150 may be associated with one or more applications that provide services to users (e.g., subscribers) such as video streaming, load balancing, security, retail, social media, telecommunication, gaming, banking, and the like. Services 150 may be associated with one or more service providers. Router 140b of system 100 includes paths (e.g., WAN connections) to the following networks: cellular network 110a, WAN 110b, and WAN 110c. Cellular network 110a, WAN 110b, and WAN 110c may provide access to one or more services 150. WAN 110b and WAN 110c may be associated with specific types of networks. For example, WAN 110b may be associated with an MPLS network and WAN 110c may be associated with a cloud network. Router 140c of system 100 includes a path to LAN services 160. LAN services 160 are network resources that are provided by a LAN service provider. LAN services may include QoS, security services, customized services to fit business needs, support services, maintenance services, and the like.

The different paths through network 110 may be associated with different benefits and/or costs from the perspective of network performance, application performance, and/or financial expenditure required. For example, the path through cellular network 110a may have lower occurrence of total failure but may have a lower overall connection speed and have high data use costs. The path through WAN 110b (e.g., a cloud-provided network) may have a relatively higher top network speed but may have lower average speed due to over-usage by the public. Configuration controller 130 may improve the performance of network 110 by analyzing network characteristics 180 (e.g., latency, delay, and packet loss) and generating configuration parameters 190 that optimize TCP flow between these types of connections.

Each router 140 of system 100 is associated with one or more nodes of network 110. Nodes are connection points that can receive, create, store, and/or send data. Nodes may be managed by an administrator (e.g., a service provider) of one or more networks. Nodes may include one or more endpoints and/or one or more redistribution points that recognize, process, and forward data to other nodes. Nodes may include data communications equipment (e.g., switches, bridges, modems, hubs, etc.), data terminal equipment (e.g., routers, servers, printers, workstations, etc.), devices (e.g., host computers, personal computers, smartphones, Internet of Things (IOT) devices, etc.), and the like.

In operation, network analytic engine 120 receives performance parameters 170 from router 140b of network 110. Router 140b is a branch router operating in an SD-WAN. The performance parameters may be associated with latency, delay, packet loss, ping, NBAR results, performance of one or more systems at one or more nodes of network 110 (e.g., current processing load, processing load capacity, current memory, memory capacity, operating time, scheduled maintenance, etc.), and the like. Network analytic engine 120 generates network characteristics 180 using performance parameters 170. Network characteristics 180 may be a subset of performance parameters 170 received from branch router 140b. Network analytic engine 120 communicates network characteristics 180 to configuration controller 130. Configuration controller 130 analyzes network characteristics 180 using one or more control algorithms and machine learning and determines that the existing parameters used by branch router 140b to configure the nodes associated with branch router 140b can be adjusted to improve TCP flow between the nodes. For example, configuration controller 130 may determine, based on network characteristics 180, that the connection speed from router 140b to cellular network 110a is faster than the connection speed from router 140b to WAN 110b due to over-usage of WAN 110b by the public. As a result of this determination, configuration controller 110 adjusts the parameters of router 140b, cellular network 110a, and WAN 110b to improve TCP flow. Configuration controller 130 generates configuration parameters 190 and communicates configuration parameters 190 to branch router 140b of network 110. Branch router 140b then uses configuration parameters 190 to improve traffic flow within the branch. As such, system 100 of FIG. 1 dynamically optimizes TCP flow between nodes of network 110.

Although FIG. 1 illustrates a particular arrangement of network 110, network analytic engine 120, configuration controller 130, routers 140, services 150, and LAN services 160, this disclosure contemplates any suitable arrangement of network 110, network analytic engine 120, configuration controller 130, routers 140, services 150, and LAN services 160. For example, network analytic engine 120 and configuration controller 130 may be combined into one network component. As another example, network analytic engine 120 and/or configuration controller 130 may be incorporated into one or more routers 140.

Although FIG. 1 illustrates a particular number of networks 110, network analytic engines 120, configuration controllers 130, routers 140, services 150, and LAN services 160, this disclosure contemplates any suitable number of networks 110, network analytic engines 120, configuration controllers 130, routers 140, services 150, and LAN services 160. For example, system 100 may include more or less than three routers 140.

FIG. 2 illustrates an example method 200 for dynamically optimizing TCP flow in WANs. Method 200 begins at step 210. At step 220, a network analytic engine (e.g., network analytic engine 120 of FIG. 1) receives performance parameters (e.g., performance parameters 170 of FIG. 1) from routers (e.g., routers 140 of FIG. 1) of a network (e.g., network 110 of FIG. 1). The network analytic engine may receive the performance parameters in real-time. The performance parameters may be associated with latency, delay, packet loss, ping, NBAR results, performance of one or more systems at the one or more nodes, and the like. Method 200 then moves from step 220 to step 230.

At step 230 of method 200, the network analytic engine generates network characteristics (e.g., network characteristics 180 of FIG. 1) using the performance parameters received from the routers. The network characteristics may include a subset of the performance parameters received from the routers, network characteristics obtained using BFD, and the like. Method 200 then moves from step 230 to step 240, where the network analytic engine communicates the network characteristics to the configuration controller. Method 200 then moves from step 240 to step 250.

At step 250, the configuration controller analyzes the network characteristics to determine whether the existing parameters used by the routers to configure the nodes of the network can be optimized. The configuration controller may analyze the network characteristics in real-time using one or more condition algorithms and/or machine learning principles. Method 200 then moves from step 250 to step 260, where the configuration controller determines whether the TCP flow between the nodes of the network can be optimized. If the configuration controller determines that the TCP flow between the nodes of the network cannot be optimized, method 200 advances from step 260 to step 290, where method 200 ends.

If the configuration controller determines that the TCP flow between the nodes of the network can be optimized, method 200 moves from step 260 to step 270, where the configuration controller generates configuration parameters (e.g., configuration parameters 190 of FIG. 1) for the nodes of the network. For example, the configuration controller may determine, based on the network characteristics, that the connection speed from a router to a first node of a network (a first connection) is faster than the connection speed from the router to a second node (a second connection) of the network. In response to this determination, the configuration controller may adjust the existing parameters of the router to prioritize the first connection over the second connection. Method 200 then moves from step 270 to step 280, where the configuration controller communicates the configuration parameters to the routers of the network. The routers may then use the configuration parameters to control TCP flow. Method 200 then moves from step 280 to step 290, where method 200 ends. As such, method 200 of FIG. 2 may be used to dynamically optimize TCP flow between nodes of a network.

Although this disclosure describes and illustrates an example method 200 for dynamically optimizing TCP flow in WANs including the particular steps of the method of FIG. 2, this disclosure contemplates any suitable method 200 for dynamically optimizing TCP flow in WANs, including any suitable steps, which may include all, some, or none of the steps of the method of FIG. 2, where appropriate. Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates particular components, devices, or systems carrying out particular steps of method 200 of FIG. 2, this disclosure contemplates any suitable combination of any suitable components, devices, or systems carrying out any suitable steps of method 200 of FIG. 2.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, an LTE network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A network controller, comprising:
one or more processors; and
one or more computer-readable non-transitory storage media coupled to the one or more processors and comprising instructions that, when executed by the one or more processors, cause the network controller to perform operations comprising:
  receiving, from a network component, network characteristics associated with one or more nodes of a network, wherein the network characteristics are further associated with network based application recognition (NBAR) results;
  analyzing the network characteristics to generate configuration parameters for the one or more nodes of the network, wherein analyzing the network characteristics comprises:
    determining, using machine learning, behavioral patterns of the network during specific time periods;
    generating one or more of the configuration parameters to fine-tune a topology of the network based on the behavioral patterns of the network during the specific time periods;
    determining that traffic traversing a first connection from a first node to a second node of the network is associated with a first application;
    determining that traffic traversing a second connection from the first node to a third node of the network is associated with a second application;
    generating one or more of the configuration parameters to prioritize the second connection over the first connection;
    determining a first operating capacity of one or more systems of a first node of the network;
    determining a second operating capacity of one or more systems of a second node of the network; and
    generating one or more of the configuration parameters to balance the first and second operating capacities of the first and second nodes; and
  communicating the configuration parameters to the one or more nodes of the network;
wherein the network characteristics are generated by the network component using a bidirectional forwarding detection (BFD) protocol.

2. The network controller of claim 1, wherein the network characteristics are further associated with at least one of:
latency;
delay;
packet loss;
ping; or
performance of one or more systems at the one or more nodes.

3. The network controller of claim 1, wherein the network component is at least one of:
a router associated with a branch office of an enterprise; or
a network analytic module.

4. The network controller of claim 1, wherein receiving the network characteristics, analyzing the network characteristics, and communicating the configuration parameters are performed in real-time.

5. A method, comprising:
receiving, by a network controller, network characteristics from a network component, wherein the network characteristics are associated with:
one or more nodes of a network, and
network based application recognition (NBAR) results;
analyzing, by the network controller, the network characteristics to generate configuration parameters for the one or more nodes of the network, wherein analyzing the network characteristics comprises:
determining, using machine learning, behavioral patterns of the network during specific time periods;
generating one or more of the configuration parameters to fine-tune a topology of the network based on the behavioral patterns of the network during the specific time periods;
determining that traffic traversing a first connection from a first node to a second node of the network is associated with a first application;
determining that traffic traversing a second connection from the first node to a third node of the network is associated with a second application;
generating one or more of the configuration parameters to prioritize the second connection over the first connection;
determining a first operating capacity of one or more systems of a first node of the network;
determining a second operating capacity of one or more systems of a second node of the network; and
generating one or more of the configuration parameters to balance the first and second operating capacities of the first and second nodes; and
communicating, by the network controller, the configuration parameters to the one or more nodes of the network;
wherein the network characteristics are generated by the network component using a bidirectional forwarding detection (BFD) protocol.

6. The method of claim 5, wherein the network characteristics are further associated with at least one of:
latency;
delay;
packet loss;
ping; or
performance of one or more systems at the one or more nodes.

7. The method of claim 5, wherein the network component is at least one of:
a router associated with a branch office of an enterprise; or
a network analytic module.

8. The method of claim 5, wherein receiving the network characteristics, analyzing the network characteristics, and communicating the configuration parameters are performed in real-time.

9. One or more computer-readable non-transitory storage media embodying instructions that, when executed by a processor, cause the processor to perform operations comprising:
receiving, from a network component, network characteristics associated with one or more nodes of a network, wherein the network characteristics are further associated with network based application recognition (NBAR) results;
analyzing the network characteristics to generate configuration parameters for the one or more nodes of the network, wherein analyzing the network characteristics comprises:
determining, using machine learning, behavioral patterns of the network during specific time periods;
generating one or more of the configuration parameters to fine-tune a topology of the network based on the behavioral patterns of the network during the specific time periods;
determining that traffic traversing a first connection from a first node to a second node of the network is associated with a first application;
determining that traffic traversing a second connection from the first node to a third node of the network is associated with a second application;
generating one or more of the configuration parameters to prioritize the second connection over the first connection;
determining a first operating capacity of one or more systems of a first node of the network;
determining a second operating capacity of one or more systems of a second node of the network; and
generating one or more of the configuration parameters to balance the first and second operating capacities of the first and second nodes; and
communicating the configuration parameters to the one or more nodes of the network;
wherein the network characteristics are generated by the network component using a bidirectional forwarding detection (BFD) protocol.

10. The one or more computer-readable non-transitory storage media of claim 9, wherein the network characteristics are further associated with at least one of:
latency;
delay;
packet loss;
ping; or
performance of one or more systems at the one or more nodes.

11. The one or more computer-readable non-transitory storage media of claim 9, wherein the network component is at least one of:
a router associated with a branch office of an enterprise; or
a network analytic module.

* * * * *